United States Patent
Wang et al.

(10) Patent No.: US 9,143,720 B2
(45) Date of Patent: Sep. 22, 2015

(54) HANDHELD ELECTRONIC DEVICE AND IMAGE PROJECTION METHOD OF THE SAME

(71) Applicant: HTC Corporation, Taoyuan County (TW)

(72) Inventors: Wei-Chien Wang, Taoyuan County (TW); Chih-Wei Hsu, Taoyuan County (TW); Cheng-Hsi Liu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 188 days.

(21) Appl. No.: 14/067,987

(22) Filed: Oct. 31, 2013

(65) Prior Publication Data

US 2015/0116601 A1  Apr. 30, 2015

(51) Int. Cl.
*G03B 21/14* (2006.01)
*H04N 5/74* (2006.01)
*G03B 21/30* (2006.01)

(52) U.S. Cl.
CPC ............ *H04N 5/7408* (2013.01); *G03B 21/145* (2013.01); *G03B 21/30* (2013.01)

(58) Field of Classification Search
CPC ... H04N 9/3173; H04N 9/3194; G03B 21/14; G03B 21/145; G03B 21/30
USPC ..................................... 353/39, 42, 121, 122
See application file for complete search history.

(56) References Cited

U.S. PATENT DOCUMENTS

| | | | |
|---|---|---|---|
| 6,727,489 B2 | 4/2004 | Yano | |
| 7,901,084 B2 * | 3/2011 | Willey et al. | 353/49 |
| 8,610,726 B2 * | 12/2013 | Pance et al. | 345/501 |
| 2005/0151941 A1 * | 7/2005 | Solomon | 353/122 |
| 2009/0303449 A1 * | 12/2009 | Schuler et al. | 353/121 |
| 2012/0214323 A1 * | 8/2012 | Gore et al. | 439/212 |
| 2013/0154485 A1 | 6/2013 | Malo et al. | |

FOREIGN PATENT DOCUMENTS

| | | |
|---|---|---|
| CN | 203219550 U | 9/2013 |
| TW | M393706 U | 12/2010 |
| TW | M455168 U | 6/2013 |

OTHER PUBLICATIONS

Corresponding Taiwanese Office Action that these art references were cited on Apr. 30, 2015.

* cited by examiner

*Primary Examiner* — William C Dowling
(74) *Attorney, Agent, or Firm* — CKC & Partners Co., Ltd.

(57) ABSTRACT

A handheld electronic device is provided. The handheld electronic device comprises a main body, a processing unit, an image projection module, a motion sensor, a first light sensor and a second light sensor. The processing module is disposed in the main body to generate display data. The image projection module generates a projection image according to the display data. The motion sensor senses an orientation of the handheld electronic device. The first and second light sensors sense an ambient light. The processing unit generates the display data according to the ambient light sensed by the first light sensor when the processing module determines that the orientation is a first orientation and according to the ambient light sensed by the second light sensor when the processing module determines that the orientation is a second orientation.

16 Claims, 6 Drawing Sheets

HANDHELD ELECTRONIC DEVICE AND IMAGE PROJECTION METHOD OF THE SAME

BACKGROUND

1. Field of Invention

The present invention relates to image projection technology. More particularly, the present invention relates to a handheld electronic device and a projection method of the same.

2. Description of Related Art

Handheld electronic devices such as smartphones and tablet PCs become the most important electronic products due to their light weight, powerful data-processing and data-transmission ability and integration of various multimedia technologies. In order to satisfy various user demands, more and more modules, such as speaker with two channels, the projector or a combination of the above, are integrated into the handheld electronic devices to bring functions with diversity and convenience to the user.

Take the projector as an example, since the technology of micro projector becomes matured, the image supposed to be displayed on the display module can be projected to a screen by the smartphone equipped with the micro projector. However, since the size of the smartphone is small, the user often accidentally flips the smartphone. The micro projector may not be able to correctly display the image when the smartphone is flipped.

Accordingly, what is needed is a handheld electronic device and a projection method of the same to address the above issues.

SUMMARY

An aspect of the present invention is to provide a handheld electronic device. The handheld electronic device includes a main body, a processing unit, an image projection module, a motion sensor, a first light sensor and a second light sensor. The processing unit is disposed in the main body to generate display data. The image projection module is coupled to the processing unit to generate a projection image according to the display data. The motion sensor is coupled to the processing unit to sense an orientation of the handheld electronic device. The first light sensor is coupled to the processing unit respectively to sense an ambient light. The second light sensor is coupled to the processing unit respectively to sense the ambient light. The processing unit generates the display data according to the ambient light sensed by the first light sensor when the processing unit determines that the orientation is a first orientation and according to the ambient light sensed by the second light sensor when the processing unit determines that the orientation is a second orientation.

Another aspect of the present invention is to provide a projection method used in a handheld electronic device, wherein the handheld electronic device comprises a processing unit, an image projection module, a motion sensor, a first light sensor and a second light sensor. The projection method includes the steps outlined below. An orientation of the handheld electronic device is sensed. A display data is generated according to an ambient light sensed by the first light sensor when the orientation is a first orientation. A display data is generated according to the ambient light sensed by the second light sensor when the orientation is a second orientation. A projection image is generated according to the display data.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
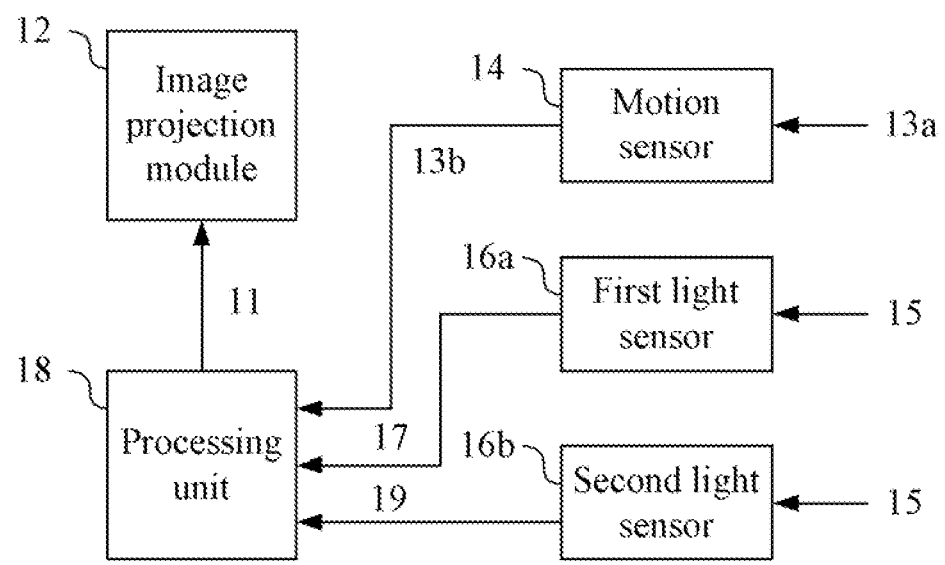
FIG. 1 is a block diagram of a handheld electronic device in an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2A:
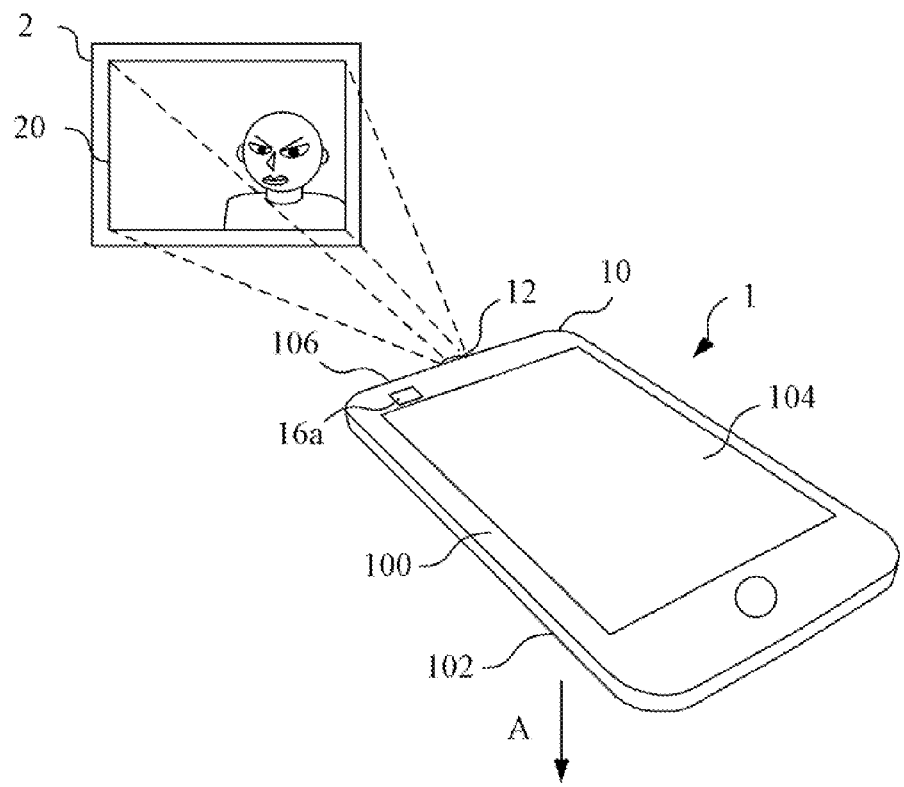
FIG. 2A is a 3 dimensional (3-D) diagram of the handheld electronic device illustrated in FIG. 1 together with a projection image generated therefrom in an embodiment of the present invention.
Figure 2B:
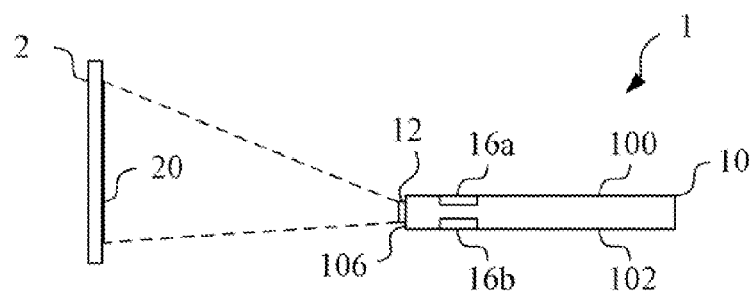
FIG. 2B is a side view of the handheld electronic device and the projection image in an embodiment of the present invention.

FIG. 1 is a block diagram of a handheld electronic device 1 in an embodiment of the present invention. FIG. 2A is a 3 dimensional (3-D) diagram of the handheld electronic device 1 illustrated in FIG. 1 together with a projection image 20 generated therefrom in an embodiment of the present invention. FIG. 2B is a side view of the handheld' electronic device 1 and the projection image 20 in an embodiment of the present invention.

The handheld electronic device 1 includes a main body 10, an image projection module 12, a motion sensor 14, a first light sensor 16a, a second light sensor 16b and a processing unit 18.

The main body 10 includes a first surface 100 and a second surface 102 relative to the first surface 100. In the present embodiment, the first surface 100 may include such as a display module 104 of the handheld electronic device 1 formed thereon.

The image projection module 12 is disposed in the main body 10 to generate a projection image 20 on the projection screen 2 according to the display data 11 generated by the processing unit 18. In different embodiments, the image projection module 12 is a micro projector having laser or a common liquid crystal projector. In an embodiment, the display data 11 includes the data of the actual content of the image frame and the data related to at least one parameter of the image projection module 12.

The at least one parameter of the image projection module 12 may include such as, but not limited to a projection brightness parameter, a projection contrast parameter, a projection focal distance parameter and a gamma correction parameter or a combination of the above. The image projection module 12 generates the projection image 20 including the content of the image frame and adjusts the at least one parameter according to the display data 11. The projection image 20 is therefore adjusted to a condition that is suitable for the environment of projection. The projection screen 2 can be any object that allows the image projection module 12 forms the projection image 20 thereon, such as but not limited to a screen or a wall.

It is noted that the location of the image projection module 12 illustrated in FIG. 2A is merely an example. In an embodiment, the image projection module 12 can be selectively disposed outside of the main body 10 directly. In another embodiment, the image projection module 12 is hidden in the main body 10 when it is not in use. The image projection module 12 is further ejected or uncapped to be exposed outside of the main body 10 when it is in use. Moreover, the image projection module 12 is selectively disposed on the first surface 100, the second surface 102 or on a side 106 of the main body 10 between the first surface 100 and the second surface 102.

In an embodiment, the motion sensor 14 is disposed inside the main body 10 to sense an orientation 13a of the main body 10 to generate a sensing signal 13b. In an embodiment, the orientation 13a of the main body 10 is the direction of the main body 10 being disposed. In different embodiments, the motion sensor 14 is a motion sensor, a G-sensor, a gyroscope, a proximity sensor, an infrared light sensor or an electronic compass to sense the direction of the motion sensor 14.

Take the G-sensor as an example, the G-sensor senses the direction of the gravity relative to the main body 10, e.g. the direction A illustrated in FIG. 2A, to generate the sensing signal 13b to determine the direction of the main body 10 being disposed. In another example, the proximity sensor senses the distance between the main body 10 and the neighboring objects to determine the direction of the main body 10 being disposed.

When the first light sensor 16a and the second light sensor 16b are not capped by other objects, the first light sensor 16a and the second light sensor 16b sense ambient light 15 of the environment that the handheld electronic device 1 resides. In the present embodiment, the when the first light sensor 16a and the second light sensor 16b are disposed on the first surface 100 and the second surface 102 respectively. The first light sensor 16a and the second light sensor 16b senses the ambient light 15 transmitting through the first surface 100 and the second surface 102 respectively. In other embodiments, the number of the light sensors is adjusted according to the practical condition. However, the light sensors should at least be disposed at different locations of the handheld electronic device 1 such that it is impossible to cap all the light sensors at the same time when the handheld electronic device 1 is disposed on a plane or is held by a hand.

The processing unit 18 is coupled to the image projection module 12, the motion sensor 14, the first light sensor 16a and the second light sensor 16b. In an embodiment, the processing unit 18 is coupled to each of the sensors through a sensor hub (not illustrated). The processing unit 18 generates display data 11 such that the image projection module 12 generates the projection image 20 accordingly.

The processing unit 18 determines the orientation 13a according to the sensing signal 13b generated by the motion sensor 14. The processing unit 18 further generates the display data 11 according to the ambient light 15 sensed by the light sensor corresponding to the orientation 13a.

In an embodiment, when the first surface 100 of the main body 10 is opposite to the direction of the gravity, the orientation is determined to be a first orientation. On the other hand, when the display module 104 on the first surface 100 of the main body 10 is toward to the direction of the gravity, the orientation is determined to be a second orientation. As illustrated to FIG. 2A, since the first surface 100 is toward the direction opposite to the direction A of the gravity, the second surface 102 may be blocked when the handheld electronic device 1 is disposed on a plane or is held by a hand since the second surface 102 is toward to the direction A of the gravity. As a result, the processing unit 18 determines that the orientation 13a sensed by the motion sensor 14 is the first orientation according to the sensing signal 13b.

Under such as condition, the possibility that the second surface 102 is blocked is higher. Therefore, after the first light sensor 16a generates a first signal 17 according to the ambient light 15, the processing unit 18 generates the display data 11 according to the first signal 17. In an embodiment, the image projection module 12 has related parameters. The processing unit 18 adjusts the display data 11 according to the sensed ambient light 15 such that the image projection module 12 adjusts the related parameters according to the display data 11 and further adjusts the projection image 20. For example, the projection module 12 adjusts the projection brightness parameter according to the display data 11 and further adjusts the brightness of the projection image 20.

In an embodiment, when the brightness of the ambient light 15 is not enough, the processing unit 18 controls the image projection module 12 to decrease the brightness of the projection image 20. On the other hand, when the brightness of the ambient light 15 is too high, the processing unit 18 controls the image projection module 12 to increase the brightness of the projection image 20. In an embodiment, the processing unit 18 controls the power of the light source (not illustrated) of the image projection module 12 to adjust the brightness of the projection image 20. In different embodiments, the light source can be such as, but not limited to lasers, light bulbs, light-emitting diodes or the backlight module of a liquid crystal display.

Figure 2C:
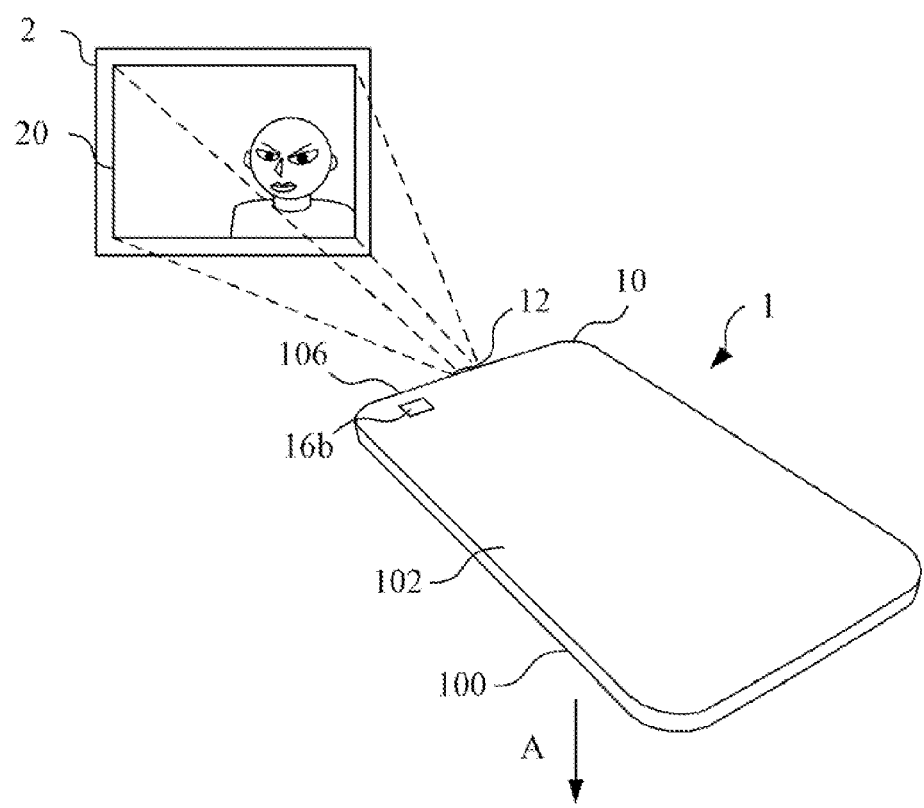
FIG. 2C is a 3-D diagram of the handheld electronic device illustrated in FIG. 1 together with a projection image generated therefrom in an embodiment of the present invention.

FIG. 2C is a 3-D diagram of the handheld electronic device 1 illustrated in FIG. 1 together with a projection image 20 generated therefrom in an embodiment of the present invention.

In the present embodiment, the handheld electronic device 1 is flipped by 180 degrees compared with the handheld electronic device 1 illustrated in FIG. 2A. Therefore, the first surface 100 is toward the direction A of the gravity, and the second surface 102 is opposite to the direction A of the gravity. The processing unit 18 thus determines that the orientation 13a sensed by the motion sensor 14 is the second orientation according to the sensing signal 13b.

Under such as condition, the possibility that the first surface 100 is blocked is higher. Therefore, after the second light sensor 16b generates a second signal 19 according to the ambient light 15, the processing unit 18 generates the display data 11 according to the second signal 19. Similarly, the processing module 18 adjusts the parameters of the image projection module 12 to further adjust the projection image 20.

In an embodiment, the display data 11 further includes an image orientation. In an embodiment, the image orientation is the direction of projection image 20 generated by the image projection module 12. After the processing module 18 determines the orientation 13a according to the sensing signal 13b from the motion sensor 14, the processing unit 18 further adjusts the image orientation, and the image projection module 12 generates the projection image 20 according to the image orientation.

For example, the orientation 13a of the handheld electronic device 1 illustrated in FIG. 2A is the first orientation, and the orientation 13a of the handheld electronic device 1 illustrated in FIG. 2C is the second orientation that is opposite to the first orientation. Therefore, the processing unit 18 adjusts the display data 11 under the condition in FIG. 2C to flip the image orientation by 180 degrees relative to the image orientation in FIG. 2A. Therefore, the projection image 20 in FIG. 2C observed by the user is still in the same direction as the projection image 20 in FIG. 2A observed by the user. No matter what orientation of the handheld electronic device 1 is, the observance of the projection image 20 is not affected by the orientation 13a.

Therefore, the handheld electronic device 1 of the present invention is able to sense the orientation 13a of the handheld electronic device 1 by using the motion sensor 14. The handheld electronic device 1 further adjusts the display data 11 according to the orientation 13a. For example, the brightness of the projection image 20 can be adjusted according to the ambient light 15 sensed by the corresponding light sensor. Further, the image orientation of the projection image 20 can be adjusted such that the observance of the projection image 20 is not affected by the orientation 13a.

Figure 3:
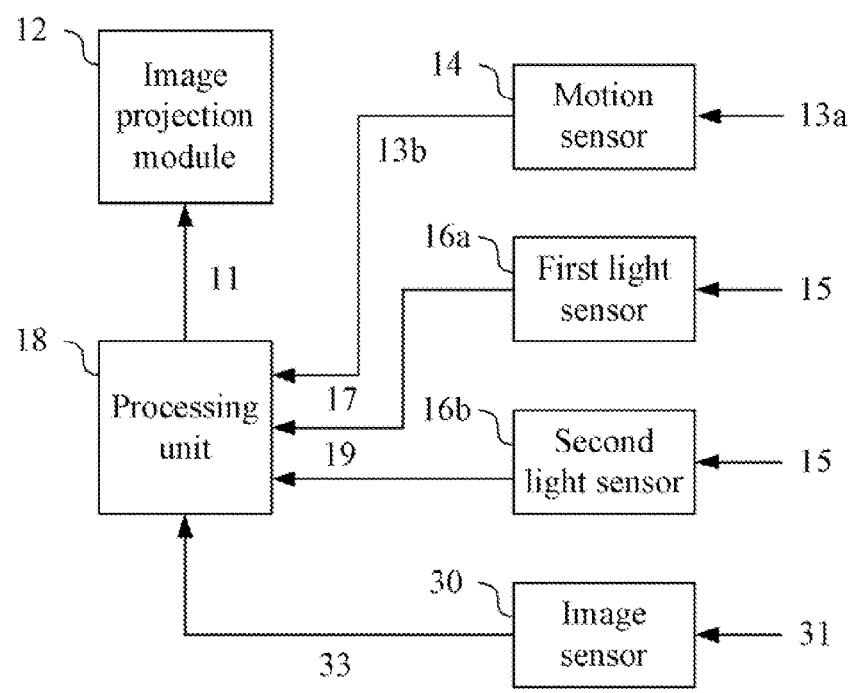
FIG. 3 is a block diagram of a handheld electronic device in another embodiment of the present invention.
Figure 4:
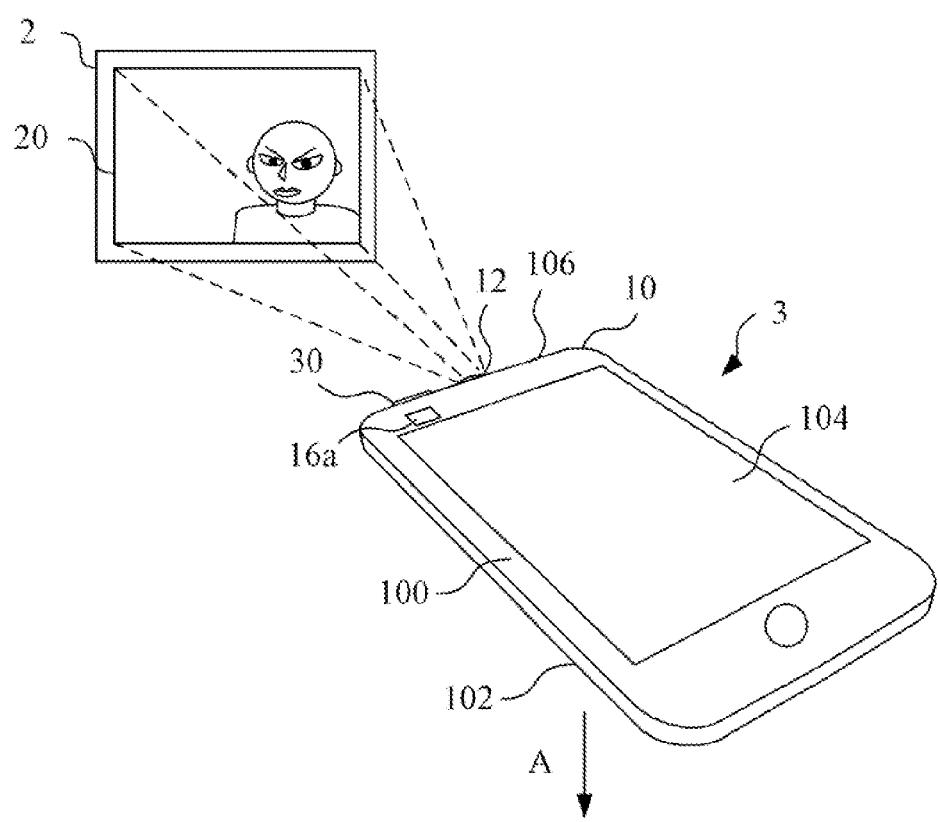
FIG. 4 is a 3-D diagram of the handheld electronic device illustrated in FIG. 3 together with a projection image generated therefrom in an embodiment of the present invention.

FIG. 3 is a block diagram of a handheld electronic device 3 in another embodiment of the present invention. FIG. 4 is a 3-D diagram of the handheld electronic device 3 illustrated in FIG. 3 together with a projection image 20 generated therefrom in an embodiment of the present invention. The handheld electronic device 3 illustrated in FIG. 3 is similar to the handheld electronic device 1 illustrated in FIG. 1. Therefore, the identical elements are not discussed in detail herein. However, in the present embodiment, the handheld electronic device 3 further includes an image sensor 30.

The image sensor 30 is coupled to the processing unit 18. In the present embodiment, the image sensor 30 is disposed on a side 106 of the main body 10 neighboring to the image projection module 12, as illustrated in FIG. 4. In other embodiments, the image sensor 30 can be selectively disposed on the first surface 100 or the second surface 102. The image sensor 30 senses the image 31 of the projection image 20 on the projection screen 2 to generate a third signal 33. The third signal 33 may include such as, but not limited to the image definition, the color distribution of the projection image 20, the distance between the projection image 20 and the main body 10, or a combination of the above.

The processing unit 18 further adjusts the display data 11 according to the third signal 33, especially the projection brightness parameter, the projection contrast parameter, the projection focal distance parameter or the projection gamma correction parameter mentioned above.

Take the projection contrast parameter and the projection focal distance parameter as an example, when the processing unit 18 obtains the statistics of the image resolution and determines that the image resolution is not enough, the processing unit 18 can increase the resolution by instantly adjusting the projection contrast parameter and the projection focal distance parameter. When the processing unit 18 determines that the projection image 20 has chromatic aberration or uneven color distribution according to the information of the color distribution in the third signal 33, the processing unit further performs correction based on the adjustment of the projection gamma correction parameter or other related parameters in the display data 11.

In another embodiment, the image sensor 30 can sense the projection screen 2 to generate the third signal 33 before actually projecting the projection image 20 on the projection screen 2. The processing unit 18 determines whether the projection screen 2 includes regions having special color, having the condition of uneven color distribution or having shadow generated due to the uneven surface. The processing unit 18 can adjust the display data according to the third signal 33 in advance such that the image projection module 12 generates the projection image 20 on the projection screen 2 according to the pre-adjusted display data 11.

For example, when the color of the projection screen 2 is green, the image projection module 12 decreases strength of the green light in the regions having the green color in the projection image 20. The projection image 20 will not be deviated too much from the original content. The uneven regions or the regions having shadows can be corrected by using the similar method.

Therefore, in the present embodiment, the handheld electronic device 1 of the present invention further uses the image sensor to adjust the projection parameters of the image projection module 12 in advance or instantly to accomplish a better display result.

Figure 5:
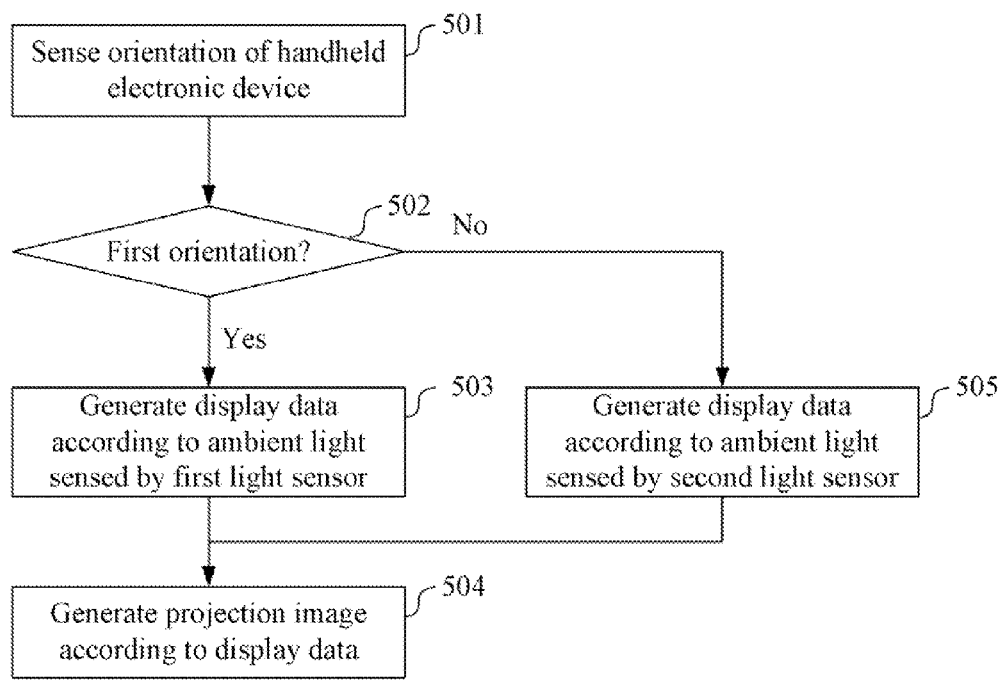
FIG. 5 is a flow chart of a projection method in an embodiment of the present invention.

FIG. 5 is a flow chart of a projection method 500 in an embodiment of the present invention. The projection method 500 is used in the handheld electronic device 1 illustrated in FIG. 1 or the handheld electronic device 3 illustrated in FIG. 3. In the present embodiment, the handheld electronic device 1 is used as the example to discuss the operation of the projection method 500. The projection method 500 includes the steps outlined below. The steps are not recited in the sequence in which the steps are performed. That is, unless the sequence of the steps is expressly indicated, the sequence of the steps is interchangeable, and all or part of the steps may be simultaneously, partially simultaneously, or sequentially performed.

In step 501, the orientation 13a of the handheld electronic device 1 is sensed.

In step 502, whether the orientation 13a is the first orientation is determined. When the orientation 13a is the first orientation, the display data 11 is generated according to the ambient light 15 sensed by the first light sensor 16a in step 503. Moreover, the projection image 20 is generated according to the display data 11 in step 504.

In step 505, when the orientation 13a is determined to be the second orientation, the display data 11 is generated according to the ambient light 15 sensed by the second light sensor 16b. Moreover, the projection image 20 is generated according to the display data 11 in step 504.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:
1. A handheld electronic device comprising:
a main body;
a processing unit disposed in the main body for generating display data;

an image projection module coupled to the processing unit for generating a projection image according to the display data;

a motion sensor coupled to the processing unit to sense an orientation of the handheld electronic device;

a first light sensor coupled to the processing unit to sense an ambient light; and a second light sensor coupled to the processing unit to sense the ambient light;

wherein the processing unit generates the display data according to the ambient light sensed by the first light sensor when the processing unit determines that the orientation is a first orientation and according to the ambient light sensed by the second light sensor when the processing unit determines that the orientation is a second orientation.

2. The handheld electronic device of claim 1, wherein the motion sensor generates a sensing signal according to the sensed orientation;

wherein when the processing unit determines that the orientation is the first orientation and the first light sensor generates a first signal according to the sensed ambient light, the processing unit generates the display data according to the first signal; and when the processing unit determines that the orientation is the second orientation and the second light sensor generates a second signal according to the sensed ambient light, the processing unit generates the display data according to the second signal.

3. The handheld electronic device of claim 1, wherein the motion sensor is a motion sensor, a G-sensor, a gyroscope, a proximity sensor, an infrared light sensor or an electronic compass.

4. The handheld electronic device of claim 1, wherein the display data comprises an image orientation, the processing unit further adjusts the image orientation according to the orientation, and the image projection module generates the projection image according to the image orientation.

5. The handheld electronic device of claim 1, wherein the main body comprises a first surface and a second surface relative to the first surface, the first light sensor is disposed on the first surface to sense the ambient light transmitting through the first surface and the second light sensor is disposed on the second surface to sense the ambient light transmitting through the second surface.

6. The handheld electronic device of claim 1, further comprising an image sensor coupled to the processing unit to sense the projection image projected on a projection screen and to generate a third signal according to the projection image, wherein the processing unit generates the image data according to the third signal.

7. The handheld electronic device of claim 1, wherein the image projection module comprises a parameter, wherein the processing unit adjusts the parameter such that the image projection module adjusts the projection image according to the parameter.

8. The handheld electronic device of claim 7, wherein the parameter comprises one of a projection brightness parameter, a projection contrast parameter, a projection focal distance parameter and gamma correction parameter or a combination of the above.

9. The handheld electronic device of claim 1, wherein the image projection module comprises a light source, the processing unit adjusts a power of the light source to adjust the brightness of the projection image.

10. A projection method for a handheld electronic device, wherein the handheld electronic device comprises a processing unit, an image projection module, a motion sensor, a first light sensor and a second light sensor, the projection method comprises:

sensing an orientation of the handheld electronic device;

generating a display data according to an ambient light sensed by the first light sensor when the orientation is a first orientation;

generating a display data according to the ambient light sensed by the second light sensor when the orientation is a second orientation; and generating a projection image according to the display data.

11. The projection method of claim 10, further comprising:

generating a sensing signal according to the sensed orientation;

when the orientation is determined to be the first orientation, a first signal is generated according to the ambient light sensed by the first light sensor, and the display data is generated according to the first signal; and when the orientation is determined to be the second orientation, a second signal is generated according to the ambient light sensed by the second light sensor, and the display data is generated according to the second signal.

12. The projection method of claim 10, wherein the display data comprises an image orientation, and the projection method further comprises:

adjusting the image orientation according to the orientation; and generating the projection image according to the image orientation.

13. The image projection method of claim 10, further comprising:

sensing the ambient light transmitting through a first surface of the handheld electronic device by the first light sensor; and sensing the ambient light transmitting through a second surface of the handheld electronic device by the second light sensor.

14. The projection method of claim 10, further comprising:

sensing the projection image projected on a projection screen;

generating a third signal according to the projection image; and generating the image data according to the third signal.

15. The projection method of claim 10, further comprising:

adjusting a parameter of the image projection module such that the image projection module adjusts the projection image according to the parameter.

16. The projection method of claim 10, further comprising:

adjusting a power of a light source of the image projection module to adjust the brightness of the projection image.

* * * * *